United States Patent [19]

Wiggins et al.

[11] Patent Number: 5,728,895
[45] Date of Patent: Mar. 17, 1998

[54] POLYMERIC THICKENERS FOR AQUEOUS COMPOSITIONS

[75] Inventors: Michael S. Wiggins, Ambler; Reuben Grinstein, Blue Bell; Stephen A. Fischer, Yardley, all of Pa.

[73] Assignee: Henkel Corporation, Plymouth Meeting, Pa.

[21] Appl. No.: 727,983

[22] Filed: Oct. 9, 1996

Related U.S. Application Data

[63] Continuation of Ser. No. 350,496, Dec. 6, 1994, abandoned, which is a continuation of Ser. No. 74,695, Jun. 8, 1993, abandoned, which is a continuation of Ser. No. 787,905, Nov. 7, 1991, abandoned, which is a continuation-in-part of Ser. No. 611,206, Nov. 8, 1990, abandoned.

[51] Int. Cl.$^6$ .................... C07C 43/30; C07C 43/11
[52] U.S. Cl. .................... 568/601; 524/502; 526/933; 568/607; 568/609; 568/611
[58] Field of Search .................... 524/502; 568/601, 568/607, 609, 611; 526/933

[56] References Cited

U.S. PATENT DOCUMENTS

| | | | |
|---|---|---|---|
| 3,244,674 | 4/1966 | Kolobielski | 568/611 |
| 3,600,406 | 8/1971 | Touval | 260/346.3 |
| 4,079,028 | 3/1978 | Emmons et al. | 260/29.6 |
| 4,155,892 | 5/1979 | Emmons et al. | 514/507 |
| 4,426,485 | 1/1984 | Hoy et al. | 524/591 |
| 4,450,305 | 5/1984 | Kamhi | 568/611 |
| 4,499,233 | 2/1985 | Tetenbaum et al. | 524/591 |
| 4,814,514 | 3/1989 | Yokota et al. | 568/608 |
| 5,095,153 | 3/1992 | Agnes et al. | 568/660 |
| 5,425,806 | 6/1995 | Doolan et al. | 106/203 |
| B1 5,425,806 | 7/1997 | Doolan et al. | 106/203 |

FOREIGN PATENT DOCUMENTS

| | | |
|---|---|---|
| 1069735 | 5/1967 | United Kingdom . |
| 9208753 | 5/1992 | WIPO . |

OTHER PUBLICATIONS

Ency. of Polymer Science & Eng. 2 Ed., vol. 6, pp. 225–273, 300 (John Wiley, 1986).

*Primary Examiner*—Shean C. Wu
*Attorney, Agent, or Firm*—John E. Drach; John Daniel Wood; Daniel E. Ortiz

[57] ABSTRACT

Latexes are thickened by compounds of the formula

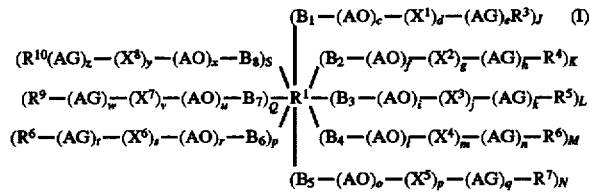

wherein $R^1$ is an aliphatic, substituted aliphatic, aromatic, or substituted aromatic radical having a valence of from 2 to 8; each of $B_1$–$B_8$ is independently an ester, amide, amine, ether, sulfide, disulfide, thiocarbamate, urea, thiourea, urethane, sulfate, phosphate, carbonyl, methylene, thioamide, carbonate, or imide linkage; each of $X^1$–$X^8$ is independently -$A_1$-$R^2$-$A_2$- or -$A_1$- wherein each of $A_1$ and $A_2$ is independently an ester, amide, amine, ether, sulfide, disulfide, urethane, thiocarbamate, urea, thiourea, sulfate, phosphate, carbonyl, methylene, thioamide, carbonate, or imide linkage and $R^2$ is a divalent aliphatic, substituted aliphatic, aromatic, or substituted aromatic radical with the proviso that only one of $B_1$–$B_8$ is urethane and that when one of $B_1$–$B_8$ is urethane, one of $A_1$ and $A_2$ is not urethane; each of d, g, j, m, p, s, v, y is independently 0 or 1, each of c, f, i, l, o, r, u, x is independently any integer or non-integer from 0 to about 200; each of J, K, L, M, N, P, Q, S is 0 or 1; each of e, h, k, n, q, t, w, z is independently any integer or non-integer from 0 to about 200; each of $R^3$–$R^{10}$ is independently an aliphatic, substituted aliphatic, aromatic, or substituted aromatic radical having from 1 to about 50 carbon atoms; each of AG and AO is independently an ethyleneoxy, 1,2-propyleneoxy, 1,2-butyleneoxy unit or combinations thereof.

9 Claims, No Drawings

POLYMERIC THICKENERS FOR AQUEOUS COMPOSITIONS

This application is a continuation of application Ser. No. 08/350,496 filed on Dec. 6, 1994, now abandoned, which is a continuation of Ser. No. 08/074,695 filed Jun. 8, 1993, now abandoned, which is a continuation of Ser. No. 07/787,905 filed on Nov. 7, 1991, now abandoned, which is a continuation in part of Ser. No. 07/611,206 filed on Nov. 8, 1990, now abandoned.

FIELD OF THE INVENTION

This invention relates to polymeric compounds which are useful as thickeners for aqueous compositions especially emulsion polymer latexes.

DESCRIPTION OF THE RELATED ART

Many aqueous systems require thickeners in order to be useful for various types of applications. Such aqueous-based systems as cosmetics, protective coatings for paper and metal, printing inks, and latex paints all require the incorporation of thickeners in order to have the proper rheological characteristics for their particular uses. Many substances useful as thickeners are known in the art. These include natural polymers such as casein and alginates, and synthetic materials such as cellulose derivatives, acrylic polymers, and polyurethane polymers. Polyurethanes have found particular application as latex paint thickeners. British patent 1,069,735 teaches a process for making water soluble or water swellable surface active products. One aspect of G.B 1,069,735 teaches that a polymer of the formula R-Y-A-Y-R wherein R is a hydrocarbon radical having more than 8 carbon atoms, Y is the group —NHCOO—, and A is a polyethylene glycol ether by reaction of a polyethylene glycol ether having a molecular weight of at least 1,000 with a monofunctional isocyanate of the formula RNCO wherein R is a hydrocarbon radical having more than 8 carbon atoms. Another aspect of G.B. 1,069,735 teaches that a polymer of the formula R-Y-(A-T)$_n$-A-Y-R wherein R is a hydrocarbon radical having more than 8 carbon atoms, Y is the group —NHCOO—, A is a polyethylene glycol ether, T is a diisocyanate residue, and n is a whole number $\leq$10 can be made by reaction of a polyethylene glycol ether having a molecular weight of at least 1,000 with a monofunctional isocyanate of the formula RNCO wherein R is a hydrocarbon radical having more than 8 carbon atoms. A third aspect taught by G.B. 1,069,735 is that a polymer of the formula R-X-(A-T)$_n$-A-X-R wherein R is a hydrocarbon radical having more than 8 carbon atoms; x is the group —NHCOO—, —SCONH—, —NHCONH—, >N—CONH—, or —CONH—; A is a polyethylene glycol ether, T is the diisocyanate residue, and n is a whole number $\leq$10 by reaction of a polyethylene glycol ether having a molecular weight of at least 1,000 and a diisocyanate so that an excess of isocyanate groups is present over those needed to react with the hydroxyl groups of the polyethylene glycol and a monofunctional alcohol, mercaptan, phenol, or carboxylic acid or a primary or secondary amine, said monofunctional compound has a hydrocarbon radical having more than 8 carbon atoms; in which process the total amount of hydrocarbon radical which contains more than 8 carbon atoms does not amount to >6% by weight of the reaction product. Japanese Kokai Patent 48-97783 teaches that compounds of the formula

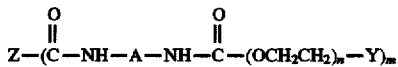

wherein Z is a polyether polyol residue derived from a compound containing active hydrogen atoms and alkylene oxide in which the polyether contains 20%–90% by weight oxyethylene groups; m is a number ranging from 2 to 8 and which signifies the number of hydroxyl groups per polyether polyol molecule; A is the residue of a divalent organic group such as a tolylene diisocyanate residue; Y is a residue of a compound containing active hydrogen atoms such as an ethoxylated C$_{14}$ aliphatic alcohol; and n is a number equal to at least 3 can be used as thickeners in aqueous media such as in latex paints. U.S. Pat. No. 4,079,028 teaches a latex paint composition containing an emulsion polymer and from 0.1 to about 10% by weight based on emulsion polymer solids of a thickener selected from polymers of Groups A, B, and C. Polymers of group A are linear polymers of the formula A-B$_p$-E$_q$-(B-E)$_m$-B$_r$-E$_t$-A wherein each of p, q, r, and t independently is zero or 1; at least one of q and r is 1, and t is zero when r is zero; provided that, when q is 1, then: (a) each of p, r, and t is zero; or (b) p is zero and each of r and t is 1; or (c) t is zero and each of r and p is 1; and when q is zero, then r is 1 and each of p and t is zero; A is a hydrophobic organic radical containing at least one carbon atom; B is a divalent hydrophobic group of the structure

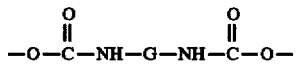

where G is the residue of an organic di- or triisocyanate; E is a divalent, hydrophilic, nonionic polyether group of molecular weight of at least about 1,500 and m is at least 1. Polymers of group B are designated are star-shaped products of the formula [H-E-OCH$_2$]$_s$L[Q$_v$-(D$_u$-E-A)$_w$R$_z$]$_m$ where L is X, Y or —O—, Q is —CH$_2$C$\equiv$, D is —CH$_2$O—, m is 2–4, s is zero to 2 the sum of m and s is the valence of L, w is 1–3, and each of u and z independently is zero or 1; and where X is a hydrocarbon radical containing at least 1 carbon atom, preferably 1–4 carbon atoms; and Y is a trivalent radical selected from —OCONH(CH$_2$)$_6$N[CONH (CH$_2$)$_6$NHCO—O]$_2$—, CH$_3$C[CH$_2$—O—OCNHC$_7$H$_6$NHCO]$_3$-, and CH$_3$CH$_2$C[CH$_2$—O—OCNHC$_7$H$_6$NHCO]$_3$— provided that: (a) when L is X, then u and w are each 1, v and z are each zero, the sum of m and s is 4, and m is at least 2; (b) when L is Y, then u, v and s are each zero, m is 3, w is 2–3, and z is zero or 1; (c) when L is —O—, then v and u are each 1, m is 2, w is 1–3, and each of s and z is zero. Polymers of group c are complex mixtures of linear, branched, and sub-branched products which form networks or hydrophobes and hydrophobic segments interspersed with hydrophilic segments. The essential elements of these polymers are a polyfunctional compound containing at least 3 hydroxyl or isocyanate groups, a difunctional compound reactive with the polyfunctional compound, and a monofunctional reactant such as a monohydroxy or monoamino compound. U.S. Pat. No. 4,155,892 teaches a composition consisting essentially of water and an amount of a thickener polymer selected from the polymers disclosed in U.S. Pat. No. 4,079,028 above to thicken the water. U.S. Pat. No. 4,499,233 teaches a water dispersable modified polyurethane which is the product of the reaction of: (a) a polyisocyanate; (b) a polyether polyol; (c) a modifying agent which is a multifunctional compound such as α, ω-amino alkanes and aromatic diamines such as 1,4-diaminobenzene; and (d) a capping agent such as a monoisocyanate. U.S. Pat. No. 4,499,233 also teaches a thickened aqueous composition comprised of water and from about 0.005 to about 10.00% by weight of a water dispersable modified polyurethane as disclosed above.

U.S. Pat. No. 4,426,485 teaches thickeners for aqueous systems which are water-soluble polymers having a molecular weight of at least 10,000 and which are comprised of hydrophobic segments each containing at least one monovalent hydrophobic group covalently bonded to the polymer. At least one of the hydrophobic segments has at least two hydrophobes thereby forming a bunch of hydrophobes within the hydrophobic segment. The hydrophobes within a bunched hydrophobic segment are in close association when they are separated by no more than about 50 covalently bonded, sequentially connected atoms. One example of such a polymer is made by reacting a polyurethane pre-polymer comprised of PEG 8000 and toluene diisocyanate with toluene diisocyanate and the diol formed by reaction of epichlorohydrin and a 10 mole ethylene oxide adduct of nonyl phenol.

A non-urethane thickener is disclosed in U.S. Pat. No. 3,770,684 which teaches latex compositions containing from about 0.1% to about 3.0% of a compound of the general formula R-X-(water soluble polyether)-X-R' wherein R and R' are water insoluble hydrocarbon residues; X is a connecting linkage selected from the group consisting of an ether linkage, an ester linkage, an amide linkage, an imino linkage, a urethane linkage, a sulfide linkage, or a siloxane linkage. U.S. Pat. No. 3,770,684 also teaches that the preferred water soluble polyether is a polyethylene oxide polymer having a molecular weight of from 3,000 to 35,000 or an ethylene oxide-propylene oxide copolymer having a molecular weight of from 3,000 to 35,000.

The compounds according to the present invention are water soluble or highly dispersable in water and do not normally require the incorporation of volatile organic cosolvents in commercial formulations. In addition, the compounds according to the invention are more efficient thickeners for aqueous compositions than thickeners of the prior art.

SUMMARY OF THE INVENTION

Compounds which are useful as thickeners for aqueous compositions particularly latex paints have the formula

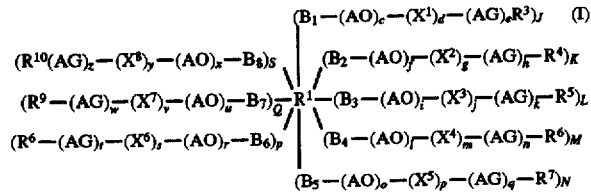

wherein $R^1$ is an aliphatic, substituted aliphatic, aromatic, or substituted aromatic radical having a valence of from 2 to 8; each of $B_{1-B8}$ is independently an ester, amide, amine, ether, sulfide, disulfide, thiocarbamate, urea, thiourea, urethane, sulfate, phosphate, carbonyl, methylene, thioamide, carbonate, or imide linkage; each of $X^1-X^8$ is independently $-A_1-R^2-A_2-$ or $-A_1-$ wherein each of $A_1$ and $A_2$ is independently an ester, amide, amine, ether, sulfide, disulfide, urethane, thiocarbamate, urea, thiourea, sulfate, phosphate, carbonyl, methylene, thioamide, carbonate, or imide linkage and $R^2$ is a divalent aliphatic, substituted aliphatic, aromatic, or substituted aromatic radical with the proviso that only one of $B_{1-B8}$ is urethane and that when one of $B_1-B_8$ is urethane, one of $A_1$ and $A_2$ is not urethane; each of d, g, j, m, p, s, v, y is independently 0 or 1, each of c, f, i, l, o, r, u, x is independently any integer or non-integer from 0 to about 200; each of J, K, L, M, N, P, Q, S is 0 or 1; each of e, h, k, n, q, t, w, z is independently any integer or non-integer from 0 to about 20; each of $R^3-R^{10}$ is independently an aliphatic, substituted aliphatic, aromatic, or substituted aromatic radical having from 1 to about 50 carbon atoms; each of AG and AO is independently an ethyleneoxy, 1,2-propyleneoxy, 1,2-butyleneoxy unit or combinations thereof.

Thickened aqueous compositions are comprised of water and a thickening-effective amount of one or more of a compound of the formula I and a latex composition comprising an emulsion polymer and from about 0.1 to about 20 percent by weight based on emulsion polymer solids of a compound of the formula I.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

In regard to figure I, the abbreviations (AO) and (AG) stand for the ethyleneoxy group $-CH_2CH_2-$, the 1,2-propyleneoxy group $-CH_2CH(CH_3)O-$, or the 1,2-butyleneoxy group $-CH(CH_2CH_3)CH_2O-$ or combinations thereof. Each of the subscripts c, f, i, l, o, r, u, x is independently any integer or non-integer from 0 to about 200 and each of the subscripts e, h, k, n, q, t, w, z is independently any integer or non-integer from 0 to about 20. One of ordinary skill in the art will appreciate that the non-integer values for the subscripts reflect the fact that they represent the average degree of alkoxylation. In the case of subscripts e, h, k, n, q, t, w, z the upper limit value is about 20. Compounds having degrees of alkoxylation ,AG, greater than 20 do not give minimum thickening when incorporated into a composition comprised of water and an emulsion polymer or when incorporated into a latex paint formulation. The abbreviations NP and DNP stand for nonylphenoxy and dinonylphenoxy respectively. For purposes of this invention, it is understood that aliphatic includes cycloaliphatic and heterocycloaliphatic wherein the heteroatoms are nitrogen, oxygen, sulfur, and phosphorus. In regard to the values of $A_1$ and $A_2$, the ester, amide, amine, ether, sulfide, disulfide, and urethane linkages are respectively

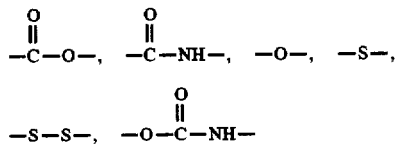

The thiocarbamate, thiourea, urea, sulfate, and phosphate linkages are respectively

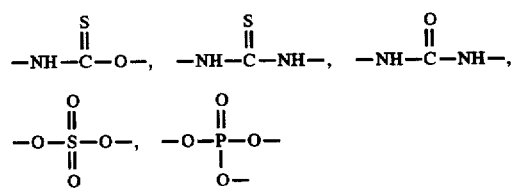

The carbonyl, methylene, thioamide, imide, and carbonate linkages are respectively

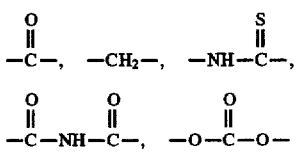

IV wherein in formula IV, $R^{12}$ has the same value as $R^1$ and y is any integer or non-integer from 1 to about 400. For example, in formula IV, when $R^{12}$ is a bis-phenol A residue, then $R^1$ would have the following structure

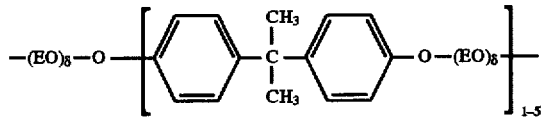

wherein δ is any integer or non-integer from 1 to about 400.

Each of $R^3$–$R^{10}$ is independently an aliphatic, substituted aliphatic, aromatic, or substituted aromatic radical having from 1 to about 50 carbon atoms. $R^1$ is aliphatic, substituted aliphatic, aromatic, or substituted aromatic radical having a valence of from 2 to 8. Such aliphatic radicals include any di- to octavalent: (a) straight chain and branched alkyl radicals having from 2 to about 50 carbon atoms; (b) cycloalkyl radicals having from 4 to about 20 carbon atoms; (c) straight chain and branched alkenyl radicals having from 2 to about 40 carbon atoms; (d) cycloalkenyl radicals having from 5 to about 20 carbon atoms; (e) straight chain and branched alkynyl radicals having from 2 to about 30 carbon atoms; cycloalkynyl radicals having from 6 to about 20 carbon atoms. Aliphatic radicals also include those above-mentioned aliphatic radicals which contain one or more heteroatoms substituted for one or more hydrogen atoms. The heteroatoms include the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like. Examples of unsubstituted alkyl radicals include but are not limited to:

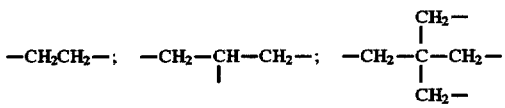

An aromatic radical is any benzenoid or non-benzenoid aromatic radical having a valence of 2 to 8. A non-benzenoid aromatic radical includes carbocyclic and heterocyclic aromatic radicals. For purposes of this invention, a substituted aromatic radical is any benzenoid or non-benzenoid aromatic radical having a valence of from 2 to 6 wherein one or more hydrogen atoms is replaced by an atom or a group of atoms other than hydrogen including the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like. Such an aromatic radical includes those radicals which contain aliphatic moieties and/or hetero atoms as exemplified in the following structures II, III and IV:

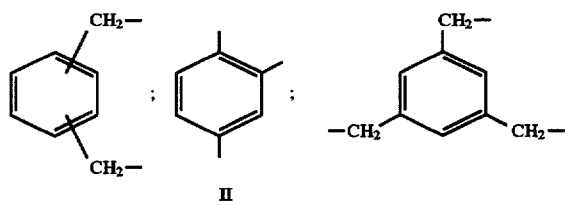

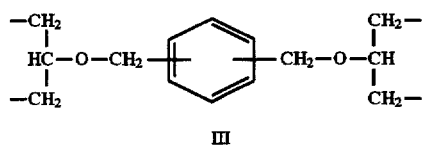

Each of $B_1$–$B_8$ is an ester, amide, amine, ether, sulfide, disulfide, thiocarbamate, urea, urethane, thiourea, sulfate, phosphate, carbonyl, methylene, thioamide, carbonate, or imide linkage as disclosed above for $A_1$ and $A_2$. While only one of $B_1$–$B_8$ can be a urethane linkage each one of $B_1$–$B_8$ can be identical when one of $B_1$–$B_8$ is not a urethane linkage. For example, each or all of $B_1$–$B_8$ can be an ether linkage or an ester linkage. The values of $A_1$ and $A_2$ are limited by the value of $B_1$–$B_8$ such that when one of $B_1$–$B_8$ is urethane, only one of $A_1$ and $A_2$ is also urethane.

The compounds according to the invention are polymeric materials which can be made by any process within the purview of those having ordinary skill in the art. One preferred method is a step-wise process, the first step of which comprises forming an adduct of the formula $R^1$-B-$(AO)_c$-OH wherein $R^1$, and c are defined as above. The symbol B in the formula for the adduct is a generic representation of $B_1$–$B_8$ and can have any value which $B_1$–$B_8$ can have. The adduct will form the center or core of a compound of the formula I because it contains $R_1$ and the linking groups $B_{1-8}$. The adduct can be made by reacting a compound of the formula $R^1$-B'Z$)_{1-8}$ wherein $R^1$ is defined as above and each B'Z is a precursor of an ester, amide, amine, ether, sulfide, disulfide, thiocarbamate, urea, urethane, thiourea, sulfate, phosphate, carbonyl, methylene, thioamide, carbonate, or imide linkage which when reacted with a polyether or an alkylene oxide will result in the formation of the respective linkage with a polyether so that each terminal atom of the functional groups of $R^1$-(B'Z)$_{1-8}$ is bonded to a terminal atom of a polyether chain. For example, if the adduct is a diester formed by reaction of adipic acid and PEG 6000, then $R^1$ is —$(CH_2)_4$- and each of $B_1$ and $B_2$ is an ester linkage. In this instance, Z of $R^1$-(B'Z)$_{1-8}$ could be hydrogen. This adduct can be made by direct or trans esterification of adipic acid with PEG 6000 using a dicarboxylic acid/polyether molar ratio which would ensure that the major product is the OH-terminated diester and not polyester. Another way of making the same adduct would be by direct ethoxylation of adipic acid with about 136 moles of ethylene oxide for each carboxyl group. In another example, if the adduct is a diamine residue, then $R^1$-(B'Z)$_{1-8}$ wherein $R^1$ is —$CH_2CH_2$—, B is an amine linkage and Z is hydrogen could be made by direct propoxylation of ethylene diamine with propylene oxide. The adduct can be formed from any aliphatic or aromatic carboxylic acid, ester, amine, hydrophobic alcohol, isocyanate, sulfide, disulfide, ketone, urea, or imide having the formula $R^1$-(B'Z)$_{1-8}$ wherein $R^1$ and B'Z are defined as above such that when it is reacted with either a ethyleneoxide, 1,2-propyleneoxide, 1,2-butyleneoxide or a combination thereof or a polyethyleneoxide, poly-1,2-propyleneoxide, or poly- 1,2-butyleneoxide or copolymers thereof, the adduct will have the formula $R^1\text{-}(B)_{1\text{-}8}\text{-}(AO)_\beta\text{-}OH$ wherein $R^1$, and B are defined as above and $\beta$ has a value of from 1.5 to about 200.

The use of a hydrophobic alcohol to form the core of the adduct described above results in the formation of a hydrophobic ether residue as $R^1$. A hydrophobic ether residue has the formula $HE(O)_\alpha$- wherein HE is a hydrophobic group and $\alpha$ is an integer having a value of from 2 to 8. A hydrophobic group is any group which would contribute to the water insolubility of the ether residue. Unsubstituted aliphatic groups having at least 4 carbon atoms, aromatic groups having 6 or more carbon atoms and groups which contain both aliphatic and aromatic moieties are hydrophobic. Examples of polyfunctional hydrophobic ether residues include but are not limited to the trimethylolpropoxy group, diphenoxy group, a diether residue of a diol produced by hydrogenation of the dimethyl ester of a dimer acid, and the bis-(2-hydroxypropyl) ether of bisphenol A.

Each of AO and AG of formula I represent an ethyleneoxy (EO), 1,2-propyleneoxy (PO), 1,2-butyleneoxy (BO) unit or combinations thereof such that each of AO and AG is a water soluble, or water dispersable polyether group. The water solubility or water dispersability of a polyether group is a function of its molecular structure and/or its molecular weight. For example, an EO homopolymer having a molecular weight of about 20,000 daltons or less is water soluble while a water soluble PO homopolymer has a molecular weight of less than about 700 daltons. The structure of an EO-PO copolymer must be such that it contains from about 50 wt % to about 75 wt % of ethyloxy groups to be water soluble. The structure-property relationships of EO and PO polyethers is described in the Encyclopedia of Polymer Science and Engineering, Second Edition, Volume 6, pages 225–273, John Wiley, 1986, while those of poly BO are described in Volume 6, page 300.

The second step of the process is reaction of the adduct formed in the first step with a monofunctional capping reagent which has a general formula $R^{3\text{-}10}\text{-}(AG)_e\text{-}XY$ wherein $R^{3\text{-}10}$, AG, and e are defined as above; X is $-A_1\text{-}R^2\text{-}Z$ wherein $A_1$ and $R^2$ are defined as above and Y is a functional group capable of reacting with the terminal OH group of the adduct $R^1\text{-}(B)_{1\text{-}8}\text{-}(AO)_c\text{-}OH$ to form an ester, amide, amine, ether, sulfide, disulfide, urethane, thiocarbamate, urea, thiourea, sulfate, phosphate, carbonyl, methylene, thioamide, carbonate, or imide linkage between $R^2$ and $-(AO)_\beta$-. For example, Y is a group capable of reacting with the terminal —OH group of the polyether when Y is a carboxyl group, isocyanate group, thiocyanate group, acyl halide group, an epoxy group, or a chlorosulfonyl group. When Y is a halomethyl group for example, it is capable of reacting with a terminal metal alkoxide derivative of the polyether to yield a methylene linkage between the polyether and the capping reagent. The capping reagent can be made from any alkoxylated aliphatic alcohol or phenol derivative as disclosed herein and any aliphatic or aromatic compound which has two functionalities capable of reaction with the —OH group of an aliphatic alcohol or a phenol including a dicarboxylic acid, an isocyanate, a dihaloalkane, or an epihalohydrin. Examples of capping reagents include but are not limited to the mono adipic acid ester of an ethoxylated nonyl phenol and the glycidyl ether of an ethoxylated nonyl phenol. The method of synthesis of the capping reagent depends upon the nature of the capping reagent.

Another preferred process for making the thickeners according to the invention is a step-wise process the first step of which comprises forming an adduct between an aliphatic, substituted aliphatic, aromatic, or substituted aromatic compound having 2 to 8 functional groups capable of reacting with an alkylene oxide or a polyalkylene oxide so that each terminal atom of the functional groups is bonded to a terminal atom of the polyoxyalkylene chain. Put in terms of formula I, a terminal atom of a polyoxyalkylene chain is covalently bonded to $R^1$ through the functional groups designated as $B_1$–$B_8$. The method of making the adduct is a function of the nature of the linking group. For example, if each OH group of glycerol is ethoxylated with ethylene oxide, then in terms of formula I, $R^1$ is a 1,2,3-propanetriyl group of the formula

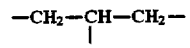

and each of $B_1$–$B_3$ is an ether linkage. In another example, if trimellitic acid is esterified with a polyethylene glycol or ethoxylated with ethylene oxide, then $R^1$ is a 1,2,4-trisubstituted phenyl group of the formula

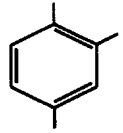

and each of $B_1$–$B_3$ is an ester linkage. The second step involves the capping of the adduct described by any one of a number of compounds which will result in a compound of formula I. For example, an ethoxylated glycerol adduct could be capped with the half $NP\text{-}(EO)_2\text{-}OH$ ester of succinic acid to form a compound of formula I in which $R^1$ is 1,2,3-propanetriyl; M, N, P, Q, S are each zero; J, K and L are each equal to one; each of $B_1$, $B_2$ and $B_3$ is an ether linkage; $R^3$, $R^4$, and $R^5$ are each nonyl-phenoxy, (AG) and (AO) are each ethyleneoxy, c and f range from about 50 to about 150, d, e, g, h i, j, and k are each zero; and $X^1$ and $X^2$ are each a succinate ester moiety such that each of $A_1$ and $A_2$ is an ester linkage and $R^2$ is an ethylene radical. Other methods of making the thickeners according to the invention are set forth in Examples 1–14.

An example of a compound wherein $R^1$ is an aromatic radical having a valence of four and which contains an aliphatic moiety and a hetero atom can be made starting with 3,3', 4,4'-benzophenone tetracarboxylic anhydride which is available from Chriskey Company, Inc. The anhydride can be reacted with a polyalkylene oxide such as polyethylene glycol to yield an adduct which can then be used in one of the preferred processes as disclosed herein. An example of a compound wherein $R^1$ is an aliphatic radical having a valence of six and which contains a hetero atom can be made starting with dipentaerythritol or pentaerythritol dimer. The dimer can be alkoxylated with an alkylene oxide to yield an adduct which can then be used in one of the preferred processes as disclosed herein. An example of a compound wherein $R^1$ is an aliphatic radical having a valence of eight and which contains a hetero atom can be made starting with tripentaerythritol or pentaerythritol trimer. The trimer can be alkoxylated with an alkylene oxide to yield an adduct which can then be used in one of the preferred processes as disclosed herein. An example of a compound wherein $R^1$ is an aliphatic radical having a valence of four and which contains a hetero atom can be made starting with a dianhydride ketone as taught by U.S. Pat. No. 3,600,406, the entire contents of which are incorporated herein by reference. The anhydride can be reacted with a polyalkylene oxide such as polyethylene glycol to yield an adduct which can then be used in one of the preferred processes as disclosed herein.

The ester, amide, amine, ether, sulfide, disulfide, thiocarbamate, urea, urethane, thiourea, sulfate, phosphate, carbonyl, methylene, thioamide, carbonate, or imide linkages can be incorporated into the compounds according to the invention either as $A_1$ and $A_2$ or $B_1$–$B_8$ linkages by any method known to those skilled in the art. Examples of such methods include but are not limited to the following reactions. The references listed for the reactions refer to Szmant, *Organic Chemistry*, Prentice Hall, Inc., 1957; Whitmore, *Organic Chemistry*, D. Van Nostrand Co., Inc., 1951; and Wagner & Zook, *Synthetic Organic Chemistry*, J. Wiley & Sons, Inc., 1953.

In a case wherein $R_1$ is m-phenylene, $B_1$ and $B_2$ can be a sulfate linkage by reacting equimolar quantities of resorcinol, $NP(EO)_{50}$-OH and sulfuric acid. (See Szmant pp 245–6; Whitmore p 158). In a case wherein $R_1$ is m-xylyl, $B_1$ and $B_2$ can be a sulfide linkage by reacting equimolar quantities of 1,3-dichloromethylbenzene (available as α, α'-dichloro-m-xylene from Aldrich Chemical Co., Milwaukee, Wisc.), $NP(EO)_{50}$-SH in the presence of sodium hydroxide. (See Szmant pp 519–520; Whitmore p 146). $NP(EO)_{50}$-SH can be made from $NP(EO)_{50}$-OH and thionyl chloride followed by reaction with a sulfide salt. In a case wherein $R_1$ is m-xylyl, $B_1$ and $B_2$ can be a disulfide linkage by reacting equimolar quantities of 1,3-bis(thiomethyl) benzene (Berichte, 42, 4346 (1909)) and $NP(EO)_{50}$-SH in the presence of hydrogen peroxide. (See Szmant pp 519–520; Whitmore p 146). In a case wherein $R_1$ is m-phenylene, $B_1$ and $B_2$ can be a phosphate linkage by reacting resorcinol and phosphorus pentoxide followed by partial transesterification with $NP(EO)_{50}$-OH (See Szmant pp 240, 245, 247). In a case wherein $R_1$ is 1,2,3-propanetriyl $B_1$ and $B_2$ can be a thiocarbamate linkage by reaction of glycerol with an isothiocyanate (See Szmant p 470). In a case wherein $R_1$ is m-phenylene, $B_1$ and $B_2$ can be a thiourea linkage by reacting m-diaminobenzene and an isothiocyanate (See Whitmore p 446). In a case wherein $R_1$ is m-phenylene, $B_1$ and $B_2$ can be a carbonate linkage by reacting equimolar quantities of resorcinol, $NP(EO)_{50}$-OH and phosgene (See Whitmore p 480). In a case wherein $R_1$ is m-phenylene, $B_1$ and $B_2$ can be an imide linkage by reacting iso-phthaloyl dichloride, urea, and the acid chloride corresponding to $NP(EO)_{50}$-OH by oxidation of $NP(EO)_{50}$-OH followed by reaction with thionyl chloride (See Wagner & Zook, p576). In a case wherein $R_1$ is p-phenylene, $B_1$ and $B_2$ can be a urea linkage by reacting 1,4-phenylene diisocyanate (available from Aldrich Chemical Co., Milwaukee, Wisc.) and $NP(EO)_{50}$-$NH_2$ which can be made by aminolysis of the corresponding halide (See Szmant pp 436–7).

One group of preferred compounds includes those wherein $R^1$ is a divalent aliphatic, substituted aliphatic, aromatic, or substituted aromatic radical; L, M, N, P, Q, S are each zero; J and K are each equal to one; each of $B_1$ and $B_2$ is an ester linkage; $R^3$ and $R^4$ are each nonyl-phenoxy, (AG) and (AO) are each ethyleneoxy, c and f are each equal to from about 90 to about 185, e and h are each about 1.5; each of $X^1$ and $X^2$ is -$A_1$-$R^2$-$A_2$- wherein each of $A_1$ and $A_2$ is an ether linkage and $R^2$ is a divalent aliphatic, substituted aliphatic, aromatic, or substituted aromatic radical. Another group of preferred compounds includes those wherein $R^1$ is a divalent aliphatic, substituted aliphatic, aromatic, or substituted aromatic radical; L, M, N, P, Q, S are each zero; J and K are each equal to one; each of $B_1$ and $B_2$ is an ether linkage; $R^3$ and $R^4$ are each nonyl-phenoxy, (AG) and (AO) are each ethyleneoxy, c and f are each equal to from about 90 to about 185, e and h are each about 1.5; each of $X^1$ and $X^2$ is -$A_1$-$R^2$-$A_2$- wherein each of $A_1$ and $A_2$ is an ether linkage and $R^2$ is a divalent aliphatic, substituted aliphatic, aromatic, or substituted aromatic radical. Another group of preferred compounds are those wherein $R^1$ is bis-(2-hydroxypropyl) ether of bisphenol A which has the formula

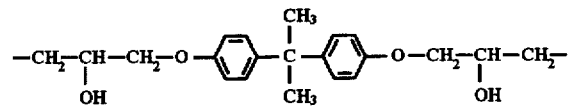

and L, M, N, P, Q, S are each zero; J and K are each equal to one; each of $B_1$ and $B_2$ is an ether linkage; $R^3$ and $R^4$ are each nonyl-phenoxy, (AG) and (AO) are each ethyleneoxy, c and f are each equal to from about 90 to about 185, e and h are each about 1.5; each of $X^1$ and $X^2$ is -$A_1$-$R^2$-$A_2$- wherein each of $A_1$ and $A_2$ is an ether linkage and $R^2$ is a divalent aliphatic, substituted aliphatic, aromatic, or substituted aromatic radical. Yet another group of preferred compounds are those wherein $R^1$ is meta-xylyl; L, M, N, P, Q, S are each zero; J and K are each equal to one; each of $B_1$ and $B_2$ is an ether linkage; $R^3$ and $R^4$ are each nonyl-phenoxy, (AG) and (AO) are each ethyleneoxy, e and h range from about 90 to about 185, c, d, f and g are each zero. Still another group of preferred compounds are those wherein $R^1$ is 1-chloroethylidene; L, M, N, P, Q, S are each zero; J and K are each equal to one; each of $B_1$ and $B_2$ is an ether linkage; $R^3$ and $R^4$ are each nonyl-phenoxy, (AG) and (AO) are each ethyleneoxy, e and h range from about 50 to about 150, c, d, f and g are each zero. A further group of preferred compounds are those wherein $R^1$ is 1,2,3-propanetriyl; M, N, P, Q, S are each zero; J, K and L are each equal to one; each of $B_1$, $B_2$ and $B_3$ is an ether linkage; $R^3$ and $R^4$ are each nonyl-phenoxy, $R^5$ is benzyl, substituted benzyl, or $C_{5-10}$ alkyl; (AG) and (AO) are each ethyleneoxy, e and h range from about 50 to about 150, c, d, f, g i, j, and k are each zero. Another group of preferred compounds are those in which $R^1$ is a tetravalent group of the formula

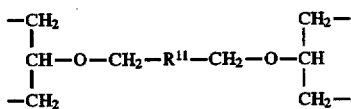

wherein $R^{11}$ is an aliphatic, substituted aliphatic, aromatic, heteroaromatic, substituted aromatic, or substituted heteroaromatic group; N, P, Q, S are each zero; J, K, L, and M are each equal to one; each of $B_1$, $B_2$, $B_3$, and $B_4$ is an ether linkage; each of $R^3$, $R^4$ $R^5$, and $R^6$ is nonyl-phenoxy; (AG) and (AO) are each ethyleneoxy, e, h, k, and n each range from about 90 to about 185, c, d, f, g, i, j, l, and m are each zero. A particularly preferred thickener for high gloss, styrene-acrylic latex paint is a composition comprised of a mixture of compounds of the formula V

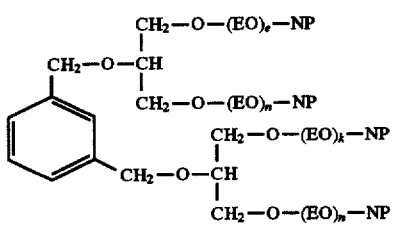

This mixture results from the synthetic method used to prepare a thickener having the above general molecular formula. The method, which is described in Example 5, produces a mixture of compounds that differ in the degree of ethoxylation because two different surfactants, NP-(EO)$_{100}$-OH and NP-(EO)$_{125}$-OH, are reacted with the epichlorohydrin. The resulting product contains a mixture of six compounds which differ only in the values of e, h, k, and n wherein: (a) each of e, h, k, and n is equal to 100; (b) each of e, h, k, and n is equal to 125; (c) three of e, h, k, and n is equal to 125 and one of e, h, k, and n is equal to 100; (d) three of e, h, k, and n is equal to 100 and one of e, h, k, and n is equal to 125; (e) any two of e, h, k, and n is equal to 100 and any two of e, h, k, and n is equal to 125; (f) one of e and h is equal to 100 and the other one of e and h is equal to 125, one of e and h is equal to 125 and the other one of e and h is equal to 100. It will be appreciated by those skilled in the art that such a mixture of compounds will result whenever two or more different surfactants are used in a process to make the thickeners according to the invention such as that described in Examples 2, 5, 6, 11, and 12. Another particularly preferred composition for thickening high gloss styrene-acrylic paint is one which contains a mixture of three compounds of formula I wherein for each compound R$^1$ is meta-xylyl; L, M, N, P, Q, S are each zero; J and K are each equal to one; each of B$_1$ and B$_2$ is an ether linkage; R$^3$ and R$^4$ are each nonyl-phenoxy, (AG) is ethyleneoxy, c, d, f and g are each zero, and: (a) e and h are each equal to about 125; (b) e and h are each equal to about 100; (c) one of e and h is equal to about 125 and the other of e and h is equal to about 100.

A group of particularly preferred thickeners for acrylic-based latex paint are compounds of the formula VI which is a compound selected from the group consisting of a liquid polyol, a liquid ethoxylated or propoxylated C$_{1-8}$ alcohol, or a liquid ethoxylated or propoxylated C$_{1-8}$ carboxylic acid. A liquid polyol is any compound having two or more —OH groups which is a liquid at room temperature examples of which include but are not limited to ethylene glycol, 1,2-propylene glycol, 1,3-propylene glycol, 1,2-butylene glycol. A liquid ethoxylated or propoxylated C$_{1-8}$ alcohol is any aliphatic alcohol ethoxylated or propoxylated to any degree of ethoxylation or propoxylation and which is a liquid. Compounds in which the —OH group of the liquid ethoxylated or propoxylated C$_{1-8}$ alcohol is etherified with a C$_{1-4}$ alkyl group are also included in this group. A liquid ethoxylated or propoxylated C$_{1-8}$ carboxylic acid is any aliphatic carboxylic acid ethoxylated or propoxylated to any degree of ethoxylation or propoxylation and which is a liquid. Preferred viscosity modifiers include butoxy triglycol (triethylene glycol monobutyl ether), butyl carbitol (diethylene glycol monobutyl ether), or 1,2-propylene glycol. Also preferred are combinations of butoxy triglycol, butyl carbitol, and 1,2-propylene glycol which total from about 1% to about 30% by weight of the total composition. An aqueous composition will typically contain about 40% by weight of water, about 40% by weight of a thickener according to the invention and about 20% by weight of one or a combination of butoxy triglycol, butyl carbitol and 1,2-propylene glycol. The preferred composition is comprised of about 40% by weight of water, about 40% by weight of a thickener according to the invention and about 20% by weight of butoxy triglycol.

The thickeners according to the invention also afford commercial thickener products which have important economic and practical advantages over conventional thickener products because they contain significantly greater amounts of thickener per unit weight of product. For example, typical commercial thickeners are aqueous compositions containing from about 20% to about 30% by weight thickener and having a Brookfield viscosity of about 15,000 cps. Thickener products containing thickeners according to the invention can be sold commercially as aqueous-based compositions containing from about 35% to about 40% by weight thickener and having Brookfield viscosities ranging from about 400–20,000 cps. The thickeners according to the

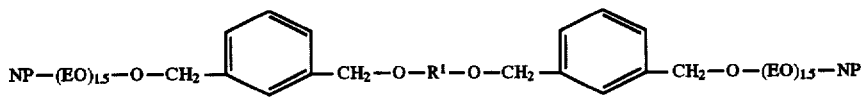

wherein R$^1$ is

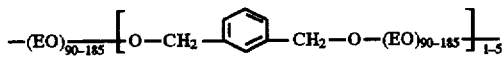

Aqueous compositions comprised of thickeners according to the invention are also part of the invention. These compositions are comprised of water and a thickening-effective amount of one or more compounds of formula I. A thickening-effective amount is any amount required to bring the Brookfield viscosity of the aqueous composition to from about 3,000 to about 5,000 cps (spindle #3, @ 30 r.p.m.). This amount will typically be from about 1 to about 50% by weight of one or both types of compounds according to the invention. An aqueous composition according to the invention is comprised of from about 1 to about 50% by weight of one or more compounds according to the invention, from about 1% to about 30% by weight of a viscosity modifier invention afford commercial products which are higher in solids and are easier to handle because of their lower viscosities. Some of the thickeners which have the general formula V also exhibit the advantage of being able to be sold commercially as aqueous solutions having no organic cosolvents. Such products enjoy the obvious health and safety benefits concomitant with purely aqueous solvents.

The thickeners according to the invention are very efficient in increasing the high shear and low shear viscosities of latexes or latex paint compositions into which they have been incorporated. Latexes are emulsions or dispersions of water insoluble polymers in water. Latex paint compositions typically contain at least an aqueous emulsion or dispersion of a water insoluble polymer, a pigment, a pigment dispersant, a thickener to control the viscosity and improve the leveling and flow characteristics of the paint, and a preservative which is effective in controlling the growth of microorganisms. Present paint industry standards call for a latex paint having an ICI viscosity of from about 0.8 to about 3.0 poise and a Stormer viscosity of from about 90 to about 110 KU. The ICI viscosity is a high shear viscosity and is measured on the ICI (Research Equipment Limited) Cone and Plate Viscosimeter at a shear rate of 10,000 sec$^{-1}$. The Stormer viscosity is given in Krebs Units (KU) and is measured according to ASTM D662-81. The latexes which can be thickened with the thickeners according to the invention are those disclosed in U.S. Pat. No. 4,079,028 at column 12 line 64 to column 14, line 7 inclusive the entire contents of which are incorporated herein by reference. The thickening ability of the compounds according to the invention can vary with the type of substance to be thickened. For example, some compounds are very efficient at thickening acrylic latexes and not as efficient at thickening styrene-acrylic latexes while others exhibit the opposite behavior. In addition, the thickening ability of a particular compound may also change when that compound is used in a paint formulation as opposed to a composition comprising only latex and water. Table 1 shows the thickening ability of some of the compounds according to the invention in three different latex-based systems.

TABLE 1

| SAMPLE[1] | ACRYLIC[2] | | STYRENE-ACRYLIC[3] | | | PAINT FORMULATION[4] | | |
|---|---|---|---|---|---|---|---|---|
| | ICI | KU | PHR[5] | ICI | KU | PHR[5] | ICI | KU |
| 1 | 4.1 | 87 | 2 | 1.2 | 101 | 2 | 1.4 | 85 |
| 2 | 2.0 | 70 | 3 | 0.8 | 90 | 2 | 1.4 | 100 |
| 3 | 3.0 | 90 | 2 | 0.8 | 123 | 2 | 1.4 | 102 |
| 4 | 3.4 | 90 | 3 | 1.2 | 123 | 2 | 1.3 | 92 |
| 5 | 1.9 | 69 | 3 | 0.7 | 74 | 3 | 1.4 | 85 |
| 6 | 3.9 | 85 | 3 | 1.3 | 122 | 2 | 1.4 | 95 |

[1]Thickener #1 is RM 1020 ™, a product of Rohm & Haas, Co.
Thickener #2 is from Example 3
Thickener #3 is from Example 8
Thickener #4 is from Example 10
Thickener #5 is from Example 7
Thickener #6 is from Example 2
[2]Refers to the viscosities of a thickener at 6 PHR in Ac64 ™, an all acrylic latex which is a product of Rohm & Haas, Co.
[3]Refers to the viscosities of a thickener in HG74 ™, a styrene-acrylic latex which is a product of Rohm & Haas, Co.
[4]Refers to a paint formulated with HG74 ™.
[5]Parts of thickener per hundred parts of latex or paint formulation.

For most commercial applications, a latex is thickened by adding a sufficient amount of an aqueous composition according to the invention to a latex to bring the ICI viscosity into the 0.8 to 3.0 poise range and the Stormer viscosity into the 95 to 105 KU. Typically this amount will be in the range of from about 0.1% to about 10% of the thickener according to the invention by weight of latex polymer solids and preferably between 1% and 3% by weight of latex polymer solids. The following examples are meant to illustrate but not limit the invention.

EXAMPLE 1

Preparation of

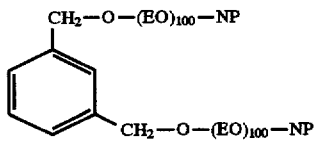

To a 250 ml round bottom flask equipped with a stirrer, nitrogen inlet tube, and a distillation head were added 1 part of NP-(EO)$_{100}$-OH (surfactant) and 2 parts of toluene. The mixture was heated to azeotropically distill off the water with stirring +N$_2$ sparge. After the water concentration is less than 50 ppm the mixture was cooled to 55° C. Sodium methoxide was added in an amount that OH:NaOMe=1:1 based on the calculated hydroxyl value of surfactant. Heat was applied to distill off formed methanol by distilling off half of the initial weight of toluene from the flask. The reaction mixture was then refluxed for 1 hour. The flask was cooled to 85° C. and one-half mole of meta-dichloromethyl benzene was added per mole sodium alkoxide. The reaction mixture was maintained at 85° C. for about 2 hours. When alkalinity by titration approached zero, the remaining toluene was vacuum stripped and butoxytriglycol (BTG) and water were added to give a clear yellow BTG/H$_2$O/product ratio of 1:2:2 by weight.

| Physical Properties | | | |
|---|---|---|---|
| Thickener | | 35% Solids Acrylic Latex (6 PHR) | |
| Visc. | Solids | ICI | KU |
| 300–600 | 39–41 | 3.5 | 88 |

EXAMPLE 2

This example illustrates the preparation of a composition which contains a mixture of three compounds. The mixture was prepared according to the procedure outlined in Example 1 and contains compounds of the formula I wherein for each compound R$^1$ is meta-xyly; L, M, N, P, Q, S are each zero; J and K are each equal to one; each of B$_1$ and B$_2$ is an ether linkage; R$^3$ and R$^4$ are each nonyl-phenoxy, (AG) is ethyleneoxy, c, d, f and g are each zero, and: (a) e and h are each equal to about 100; (b) e and h are each equal to about 125; (c) one of e and h is equal to about 125 and the other of e and h is equal to about 100. The procedure of Example 1 was followed except that the surfactant was composed of NP-(EO)$_{100}$-OH and NP-(EO)$_{125}$-OH in a molar ratio of 1.4 moles of NP-(EO)100-OH and 1.0 moles of NP-(EO)$_{125}$-OH.

| Physical Properties | | | |
|---|---|---|---|
| Thickener | | 35% Solids Acrylic Latex (6 PHR) | |
| Visc. | Solids | ICI | KU |
| 300–600 | 39–41 | 3.9 | 86 |

EXAMPLE 3

Preparation of

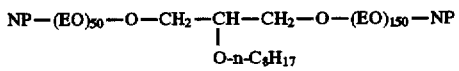

NP—(EO)$_{50}$—O—CH$_2$—CH—CH$_2$—O—(EO)$_{150}$—NP
　　　　　　　　　　|
　　　　　　　　O-n-C$_8$H$_{17}$

To a first 250 ml round bottom flask equipped with a stirrer, nitrogen inlet tube, and a distillation head were added 1 part of NP-(EO)$_{150}$-OH (surfactant) and 2 parts of toluene. To a second 250 ml round bottom flask equipped with a stirrer, nitrogen inlet tube, and a distillation head were added 1 part of NP-(EO)$_{50}$-OH (surfactant) and 2 parts of toluene. Both flasks were heated to azeotropically distill off the water with stirring +N₂ sparge. After the water concentration in each flask was less than 50 ppm the mixture was cooled to 55° C. Sodium methoxide was added to each flask in an amount that OH:NaOMe=1:1 based on the calculated hydroxyl value of surfactant. Heat was applied to distill off formed methanol by distilling off half of the initial weight of toluene from the flask. In the first flask, the reaction mixture was then refluxed for 1 hour. The flask was cooled to 60° C. afterwhich 1.1 moles of epichlorohydrin were added per mole sodium alkoxide. The reaction mixture was then maintained at 70° C. for about 2 hours. When alkalinity by titration approached zero, the excess epichlorohydrin was vacuum stripped. A 4.0 gram aliquot of the reaction mixture +4 grams of tetraethylammonium bromide were dissolved in 50 ml of glacial acetic acid and the resulting solution titrated with a 0.1036 N HClO₄ in glacial acetic acid solution to a methyl violet end point for the amount of epoxide (epoxy titration). The difference in the total alkalinity minus the HClO₄ titration equals the amount of epoxide. The contents of the first and second flasks were mixed in a third flask such that the epoxy/alkoxide molar ratio was equal to 1:1 and the contents heated to 75°–85° C. for 2 hours. When the epoxy titration value equaled zero, 1-chlorooctane was added such that the mole ratio of Cl:ONa was 1:1. The reaction mixture was then refluxed until the alkalinity titration value was zero. Butoxytriglycol (BTG) and water were added to give a clear yellow BTG/H₂O/product ratio of 1:2:2 by weight.

| Physical Properties | | | |
|---|---|---|---|
| Thickener | | 35% Solids Acrylic Latex (6 PHR) | |
| Visc. | Solids | ICI | KU |
| 300–600 | 39–41 | 2.0 | 70 |

EXAMPLE 4

Preparation of

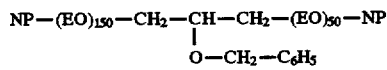

NP—(EO)₁₅₀—CH₂—CH—CH₂—(EO)₅₀—NP
  |
  O—CH₂—C₆H₅

This compound was made according to the procedure of Example 3 in except that the 1-chlorooctane was replaced by benzyl chloride on a mole-for-mole basis.

| Physical Properties | | | |
|---|---|---|---|
| Thickener | | 35% Solids Acrylic Latex (6 PHR) | |
| Visc. | Solids | ICI | KU |
| 300–600 | 39–41 | 1.3 | 65 |

EXAMPLE 5

This example illustrates the preparation of a composition which contains a mixture of three compounds of the formula I wherein for each compound $R^1$ is 1,2,3-propanetriyl; M, N, P, Q, S are each zero; J, K, and L are each equal to one; each of $B_1$, $B_2$, and $B_3$ is an ether linkage; $R^3$ and $R^4$ are each nonyl-phenoxy, $R^5$ is benzyl; (AG) is ethyleneoxy, c, d, f, g, i, j, and k are each zero, and: (a) e and h are each equal to about 125; (b) e and h are each equal to about 100; (c) one of e and h is equal to about 125 and the other of e and h is equal to about 100. The mixture was prepared by adding to a 250 ml round bottom flask equipped with a stirrer, nitrogen inlet tube, and a distillation head 1 mole each of NP-(EO)₁₀₀-OH and NP-(EO)₁₂₅-OH (surfactant) and 100 grams of toluene. The mixture was heated to azeotropically distill off the water with stirring +N₂ sparge. After the water concentration is less than 50 ppm the mixture was cooled to 60° C. Sodium methoxide was added in an amount that OH:NaOMe=1:1 based on the calculated hydroxyl value of surfactant. The reaction mixture was heated to 125 ° C. to distill off toluene/methanol which took about 2 hrs. The contents of the flask were cooled to 60° C. and sufficient epichlorohydrin was added so that the epichlorohydrin:alkoxide ratio was 0.55:1.0. The reaction mixture was maintained at 60° C. with stirring and nitrogen sparge for about 4 hours. When alkalinity by titration reached one-half its original value and the epoxide value reached zero, sufficient benzyl chloride was added so that the Cl:ONa ratio was equal to 1:1. The reaction mixture was then refluxed at 125° C. until the alkalinity titration approached zero, which took about 5 hrs. The remaining toluene was vacuum stripped and butoxytriglycol (BTG) and water were added to give a clear yellow BTG/H₂O/product ratio of 1:2:2 by weight.

| Physical Properties | | | |
|---|---|---|---|
| Thickener | | 35% Solids Acrylic Latex (6 PHR) | |
| Visc. | Solids | ICI | KU |
| 300–600 | 39–41 | 2.2 | 75 |

EXAMPLE 6

This example illustrates the preparation of a composition which contains a mixture of three compounds and is an exact duplicate of Example 5 in every respect except that NP-(EO)₁₀₀-OH and NP-(EO)₁₂₅-OH were replaced by NP-(EO)₁₀₀-OH and NP-(EO)₁₅₀-OH on an equimolar basis.

| Physical Properties | | | |
|---|---|---|---|
| Thickener | | 35% Solids Acrylic Latex (6 PHR) | |
| Visc. | Solids | ICI | KU |
| 300–600 | 39–41 | 2.4 | 80 |

EXAMPLE 7

Preparation of

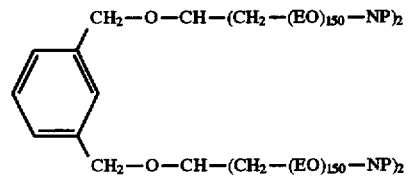

CH₂—O—CH—(CH₂—(EO)₁₅₀—NP)₂

CH₂—O—CH—(CH₂—(EO)₁₅₀—NP)₂

The procedure of Example 5 was repeated except that all of the surfactant was NP-(EO)₁₅₀-OH and the benzyl chloride was replaced by meta-dichloromethyl benzene on a 1 mole of benzyl chloride to 0.5 mole meta-dichloromethyl benzene basis.

| Physical Properties | | | |
|---|---|---|---|
| Thickener | | 35% Solids Latex (6 PHR) | |
| Visc. | Solids | ICI | KU |
| 300–600 | 39–41 | 1.9 | 69 |

EXAMPLE 8

Preparation of

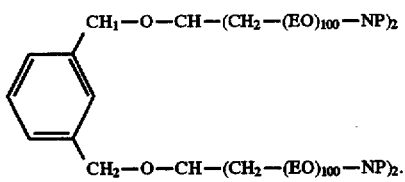

The procedure of Example 5 was repeated except that all of the surfactant was NP-(EO)$_{100}$-OH and the benzyl chloride was replaced by meta-dichloromethyl benzene on a 1 mole of benzyl chloride to 0.5 mole meta-dichloromethyl benzene basis.

| Physical Properties | | | |
|---|---|---|---|
| Thickener | | 35% Solids Acrylic Latex (6 PHR) | |
| Visc. | Solids | ICI | KU |
| 300–600 | 39–41 | 3.0 | 90 |

EXAMPLE 10

Preparation of

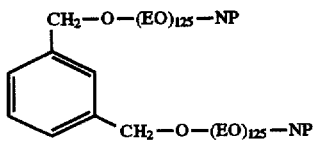

The compound was made according to the procedure of Example 1 except that NP-(EO)$_{100}$-OH was replaced by NP-(EO)$_{125}$-OH on an equimolar basis.

| Physical Properties | | | |
|---|---|---|---|
| Thickener | | 35% Solids Acrylic Latex (6 PHR) | |
| Visc. | Solids | ICI | KU |
| 300–600 | 39–41 | 3.4 | 90 |

EXAMPLE 11

This example illustrates the preparation of a composition which contains a mixture of six compounds. The mixture contained compounds of the formula I wherein N, P, Q, S are each zero; J, K, L and M are each equal to one; each of $B_1$, $B_2$, $B_3$ and $B_4$ is an ether linkage; $R^3$, $R^4$, $R^5$ and $R_6$ are each nonyl-phenoxy, (AG) is ethyleneoxy, c, f, i, l, o, r, u, and x are each zero; and wherein e, h, k, and n are each equal to 100 or 125 or a combination thereof as explained below and $R^1$ is

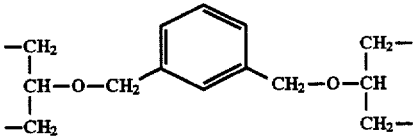

wherein: (a) each of e, h, k, and n is equal to 100; (b) each of e, h, k, and n is equal to 125; (c) three of e, h, k, and n is equal to 125 and one of e, h, k, and n is equal to 100; (d) three of e, h, k, and n is equal to 100 and one of e, h, k, and n is equal to 125; (e) any two of e, h, k, and n is equal to 100 and any two of e, h, k, and n is equal to 125; (f) one of e and h is equal to 100 and the other one of e and h is equal to 125, one of e and h is equal to 125 and the other one of e and h is equal to 100. This composition was made by the procedure outlined in Example 5 except that all of the surfactant was a mixture of NP-(EO)$_{100}$-OH and of NP-(EO)$_{125}$-OH in a molar ratio of 1.4 moles of NP-(EO)$_{100}$-OH and 1.0 moles of NP-(EO)$_{125}$-OH and the 1-chlorooctane was replaced by meta-dichloromethyl benzene on a 1 mole of 1-chlorooctane to 0.5 mole meta-dichloromethyl benzene basis.

| Physical Properties | | | |
|---|---|---|---|
| Thickener | | 35% Solids Acrylic Latex (6 PHR) | |
| Visc. | Solids | ICI | KU |
| 300–600 | 39–41 | 3.5 | 102 |

EXAMPLE 12

This example illustrates the preparation of a composition which contains a mixture of three compounds. The mixture was prepared according to the procedure outlined in Example 1 and contains compounds of the formula I wherein for each compound $R^1$ is meta-xylyl; L, M, N, P, Q, S are each zero; J and K are each equal to one; each of $B_1$ and $B_2$ is an ether linkage; $R^3$ and $R^4$ are each nonyl-phenoxy, (AG) is ethyleneoxy, c, d, f and g are each zero, and: (a) e and h are each equal to about 125; (b) e and h are each equal to about 100; (c) one of e and h is equal to about 150 and the other of e and h is equal to about 125. The procedure of Example 1 was followed except that the surfactant was composed of equimolar amounts of NP-(EO)$_{125}$-OH and NP-(EO)$_{100}$-OH.

| Physical Properties | | | |
|---|---|---|---|
| Thickener | | 35% Solids Styrene-Acrylic Latex (6 PHR) | |
| Visc. | Solids | ICI | KU |
| 300–600 | 39–41 | 3.5 | 102 |

EXAMPLE 13

Preparation of

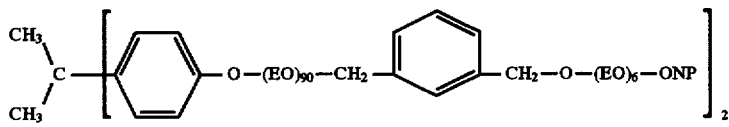

To a first 250 ml round bottom flask equipped with a stirrer, nitrogen inlet tube, and a distillation head were added 1 part of DNP-(EO)$_6$-OH and 2 parts of toluene. To a second 250 ml round bottom flask equipped with a stirrer, nitrogen inlet tube, and a distillation head were added 1 part of bis-phenol A ethoxylated with about 180 moles of ethylene oxide and 2 parts of toluene. Both flasks were heated to azeotropically distill off the water with stirring +N$_2$ sparge. After the water concentration in each flask was less than 50 ppm the mixture was cooled to 60° C. Sodium methoxide was added to each flask in an amount that OH:NaOMe=1:1 based on the calculated hydroxyl value of surfactant. Heat was applied to distill off formed methanol by distilling off half of the initial weight of toluene from the flask then the contents were refluxed for 1 hour with N$_2$ sparge. The flask was cooled to 60° C. afterwhich 1.1 moles of epichlorohydrin were added per mole sodium alkoxide. The reaction mixture was then maintained at 70° C. until the alkalinity by titration approached zero. The excess epichlorohydrin was vacuum stripped. A 4.0 gram aliquot of the reaction mixture +4 grams of tetraethylammonium bromide were dissolved in 50 ml of glacial acetic acid and the resulting solution titrated with a 0.1036 N HClO$_4$ in glacial acetic acid solution to a methyl violet end point for the amount of epoxide (epoxy titration). The difference in the total alkalinity minus the HClO$_4$ titration equals the amount of epoxide. The contents of the first flask were added to the second flask, which had been cooled to 110° C. in an amount such that the epoxy/alkoxide molar ratio was equal to 1:1. This mixture was held at 110° C. overnight. When the epoxy titration value equaled zero, the remaining toluene was vacuum distilled. Butoxytriglycol (BTG) and water were added to give a clear yellow BTG/H$_2$O/product ratio of 1:5:3 by weight.

wherein R$^1$ is

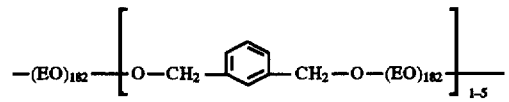

To a first 250 ml round bottom flask equipped with a stirrer, nitrogen inlet tube, and a distillation head were added 1 part of NP-(EO)$_{1.5}$-OH and 2 parts of toluene. To a second 250 ml round bottom flask equipped with a stirrer, nitrogen inlet tube, and a distillation head were added 1 part of polyethylene glycol (M.W.=8,000) and 2 parts of toluene. Both flasks were heated to azeotropically distill off the water with stirring +N$_2$ sparge. After the water concentration in each flask was less than 50 ppm the mixture was cooled to 60° C. Sodium methoxide was added to each flask in an amount that OH:NaOMe=1:1 based on the calculated hydroxyl value of surfactant. Heat was applied to distill off formed methanol by distilling off half of the initial weight of toluene from the flask then the contents were refluxed for 1 hour with N$_2$ sparge. The first flask was cooled to room temperature while maintaining reflux in the second flask. To the first flask one mole of meta-dichloromethyl benzene was added per mole sodium alkoxide and the reaction mixture was then maintained at 60° C. until the alkalinity by titration approached zero. The contents of the second flask were cooled to 60° C. and then the contents of the first flask were added to it so that the dichloromethylbenzene to sodium alkoxide ratio was 1.05:1.00. The temperature as maintained at 60° C. until the alkalinity approached zero. The remaining toluene was vacuum distilled. Butoxytriglycol (BTG) and water were added to give a cloudy-white BTG/H$_2$O/product ratio of 1:2:2 by weight.

| Physical Properties | | | |
|---|---|---|---|
| Thickener | | 35% Solids Acrylic Latex (3 PHR) | |
| Visc. | Solids | ICI | KU |
| 700 | 30% | 0.70 | 66 |

| Physical Properties | | | |
|---|---|---|---|
| Thickener | | 35% Solids Acrylic Latex (3 PHR) | |
| Visc. | Solids | ICI | KU |
| 1900 | 40% | 1.8 | 124 |

EXAMPLE 14

Preparation of

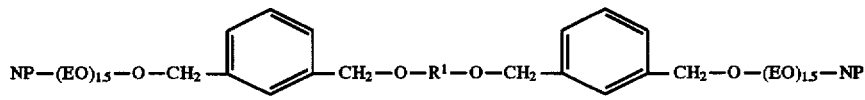

COMPARATIVE EXAMPLE

Preparation of

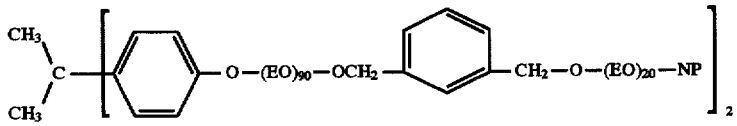

This example illustrates the effect of the degree of alkoxylation of the alkyleneoxy group adjacent to $R^{3-10}$ on the performance of the thickener. When the degree of ethoxylation of the alkyleneoxy group adjacent to $R^{3-10}$ is equal to or greater than 20, the compound does not thicken a latex.

A capping reagent was prepared by adding to a 250 ml round bottom flask equipped with a stirrer, nitrogen inlet tube, and a distillation head about 1 part of NP-(EO)$_{20}$-OH (surfactant) and 2.5 parts of toluene. The mixture was heated to azeotropically distill off the water with stirring +N$_2$ sparge. After the water concentration is less than 50 ppm the mixture was cooled to 55° C. Sodium methoxide was added in an amount that OH:NaOMe=1:1 based on the calculated hydroxyl value of surfactant. Heat was applied to distill off 98 grams total of methanol and toluene from the flask. The reaction mixture was then refluxed for 1 hour. The flask was cooled to 90° C. and one mole of meta-dichloromethyl benzene was added per mole sodium alkoxide. The reaction mixture was refluxed until the alkalinity by titration approached zero.

To another 250 ml round bottom flask equipped with a stirrer, nitrogen inlet tube, and a distillation head were added 1 part of bis-phenol A ethoxylated with about 180 moles of ethylene oxide [HO-(EO)$_{90}$-BPA-(EO)$_{90}$-OH] and one part of toluene. The mixture was heated to azeotropically distill off the water with stirring +N$_2$ sparge until the hydroxyl number reached 12.9. Sodium methoxide was added in an amount that OH:NaOMe=1:1 based on the calculated hydroxyl value of surfactant. Heat was applied to distill off 47 grams total of methanol and toluene from the flask and the hydroxyl value of the material in the flask reached 12. About 12 grams of the capping reagent were added and the reaction mixture heated until about 1% alkalinity by weight remained as determined by HCl titration. The remaining toluene was vacuum stripped and butoxytriglycol (BTG) and water were added to give BTG/H$_2$O/product ratio of 1:2:2 by weight. This compound did not thicken either an acrylic or styrene-acrylic latex at any commercially useful concentrations.

What is claimed is:

1. A compound of the formula:

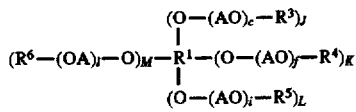

wherein $R^1$ is a member selected from the group consisting of straight chain or branched aliphatic groups having from 3 to about 50 carbon atoms, cycloalkyl groups having from 4 to 20 carbon atoms, straight chain or branched unsaturated aliphatic groups having from 3 to about 40 carbon atoms, cycloalkenyl groups having from 5 to about 20 carbon atoms, and aromatic groups having from 6 to about 21 carbon atoms having a valence of 3 or 4; each of c, f, i, and l is independently 0 or any integer from about 50 to about 200 with the proviso that at least two of c, f, i and l cannot be 0; each of J, K, L and M is 0 or 1, provided that at least three of J, K, L and M are 1; each of $R^3$–$R^6$ is independently an aliphatic or aromatic group having from 1 to 50 carbon atoms; and each AO is independently an ethyleneoxy, 1, 2 propyleneoxy, 1, 2 butyleneoxy group or combinations thereof and when one of J, K, L or M is 0, the valence is filled by hydrogen.

2. A compound of claim 1 wherein $R^1$ is 1,2,3-propanetriyl; and J, K and L are each equal to one; M is zero; each (AO) is ethyleneoxy.

3. A compound of claim 2 wherein c and f each range from about 50 to about 150 and i is zero.

4. The compound of claim 3 wherein $R^3$ and $R^4$ are each nonylphenyl, $R^5$ is benzyl or $C_{6-10}$ alkyl.

5. The composition comprising a mixture of compounds of claim 1 wherein for each compound $R^1$ is 1,2,3-propanetriyl; J, K, and L are each equal to one; M is zero; $R^3$ and R4 are each nonylphenyl, $R^5$ is benzyl; (AO) is ethyleneoxy; and in a first compound c and f are each equal to about 125; in a second compound c and f are each equal to about 100; in a third compound one of c and f is equal to about 125 and the other of c and f is equal to about 100.

6. The compound of claim 1 of the formula

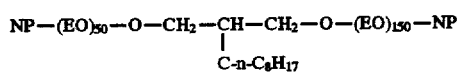

wherein NP is a nonylphenyl group and EO is an ethyleneoxy group.

7. A compound of claim 1 having the formula

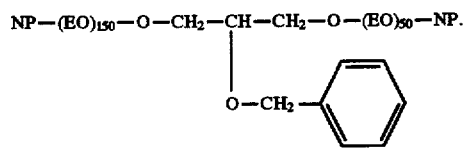

8. A compound of claim 1 wherein $R^1$ is

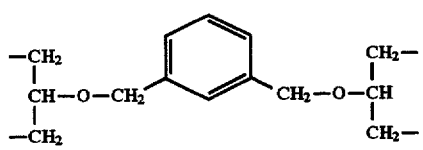

wherein J, K, L and M are each equal to one; $R^3$, $R^4$, $R^5$ and $R^6$ are each nonylphenyl, (AO) is ethyleneoxy, and c, f, i, and l are each independently equal to from about 90 to about 185.

9. A composition comprising a mixture of compounds of claim 1 wherein for each compound J, K, L and M are each equal to one; $R^3$, $R^4$, $R^5$ and $R^6$ are each nonylphenyl, (AO) is ethyleneoxy. $R^1$ is

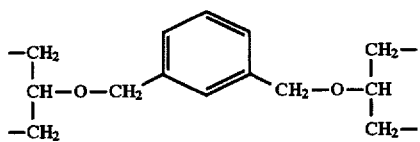

and wherein in a first compound each of c, f, i, and l is equal to 100; in a second compound each of c, f, i, and l is equal to 125; in a third compound three of c, f, i, and l is equal to 125 and one of c, f, i, and l is equal to 100; in a fourth compound three of c, f, i, and l is equal to 100 and one of c, f, i, and l is equal to 125; in a fifth compound any two of c, f, i, and l is equal to 100 and any two of c, f, i, and l is equal to 125; in a sixth compound one of c and f is equal to 100 and the other one of c and f is equal to 125, one of c and f is equal to 125 and the other one of c and f is equal to 100.

* * * * *